United States Patent Office 3,406,337
Patented Oct. 15, 1968

3,406,337
CAPACITIVE PEAK POWER INDICATOR CIRCUIT GATED BY PEAK SENSING CIRCUIT
Dean S. Thornberg, Richard M. Jepperson, and Marvin W. Loosle, Salt Lake City, Utah, assignors, by mesne assignments, to LTV Electrosystems, Inc., Greenville, Tex., a corporation of Delaware
Filed Nov. 21, 1963, Ser. No. 325,390
4 Claims. (Cl. 324—103)

The present invention relates to circuit means for indicating the peak values of signals such as video signals, particularly such signals that may be provided from a diode detector indicating the envelope of an RF pulse which are square or Gaussian shapes and which signals are positive in amplitude, generally between values of 1.0 and 4.0 volts. More particularly, the invention has reference to peak power indicating means of Gaussian shaped and square-shaped positive going pulses. The Gaussian shaped pulse is a pulse having a curve that may represent a probability density function or a frequency curve as is used in statistics, and is sometimes called the probability curve. Therefore, the circuit of the invention seeks to provide new and improved indicator circuitry directed to providing a direct reading of the average peak value of repetitive Gaussian shaped or square pulses.

Basically, the present invention provides a circuit for charging a capacitor through an electronic switch to a value proportional to the peak value or the pulse being measured or indicated, and then, maintaining the charge on the capacitor until the next incoming pulse charges or discharges the capacitor depending upon its peak value. After the capacitor has been charged to the value proportional to the peak value of the pulse and the electronic switch has been opened, the capacitor's only discharge path through a high impedance of the open electronic switch and a high impedance direct current amplifier which provides thereby a time constant of the capacitor discharge a path that is generally in excess of one second. A meter is connected to the output of the high impedance direct current amplifier and the meter is calibrated to read the average peak value of the incoming signals. In the particular embodiment of the invention shown here the meter is calibrated to read the peak power of the RF signal generated by equipment having pulses which are desired to be measured.

Therefore, it is an object of the invention to provide circuit means for providing a charge to a capacitor directly proportional to the peak value of a pulse, whether the pulse is Gaussian or square shaped.

Also, it is an object of the invention to provide indicator means for measuring peak values of pulses without integrating the current under the pulse curve.

Figure 1:
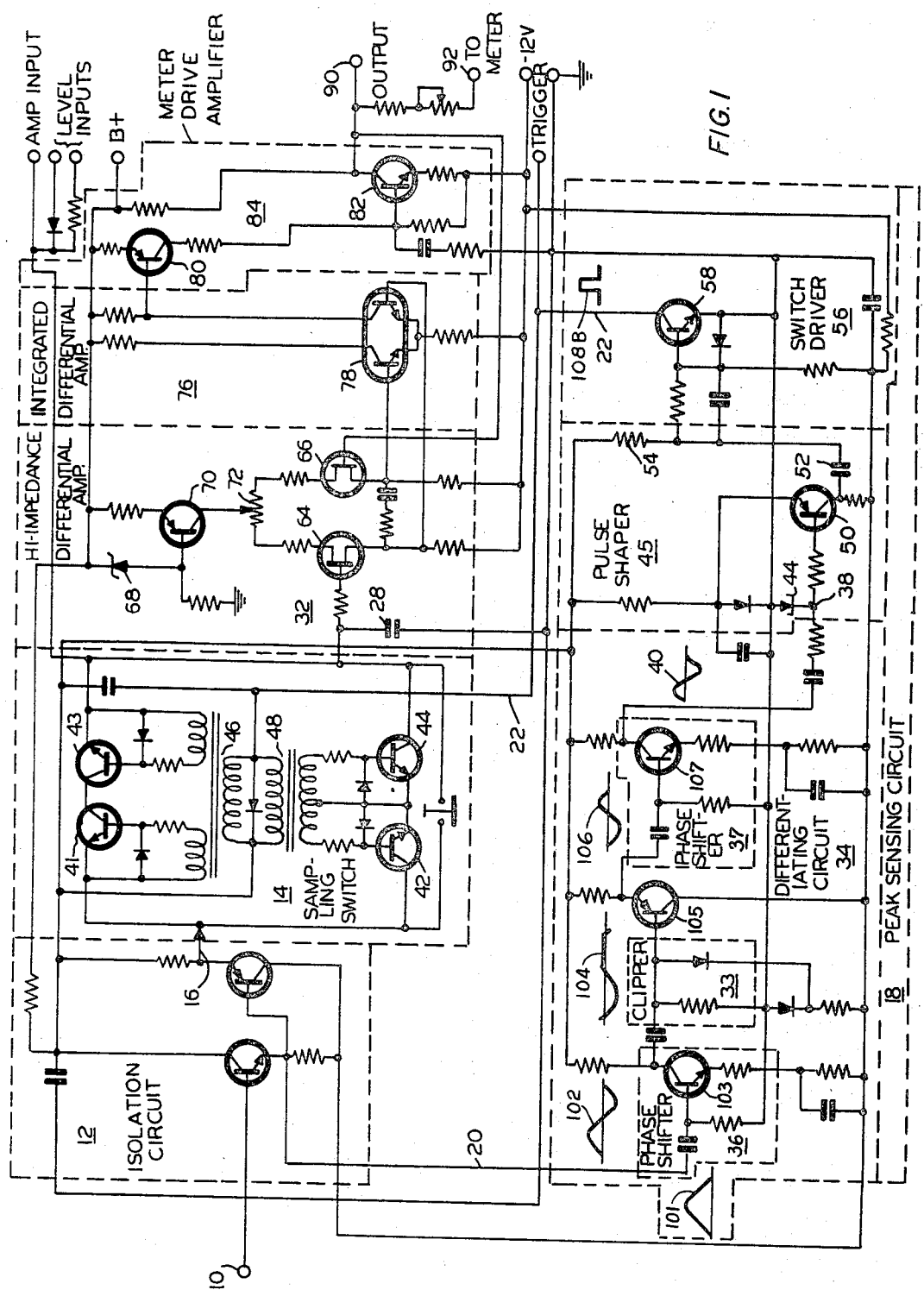
Figure 2:
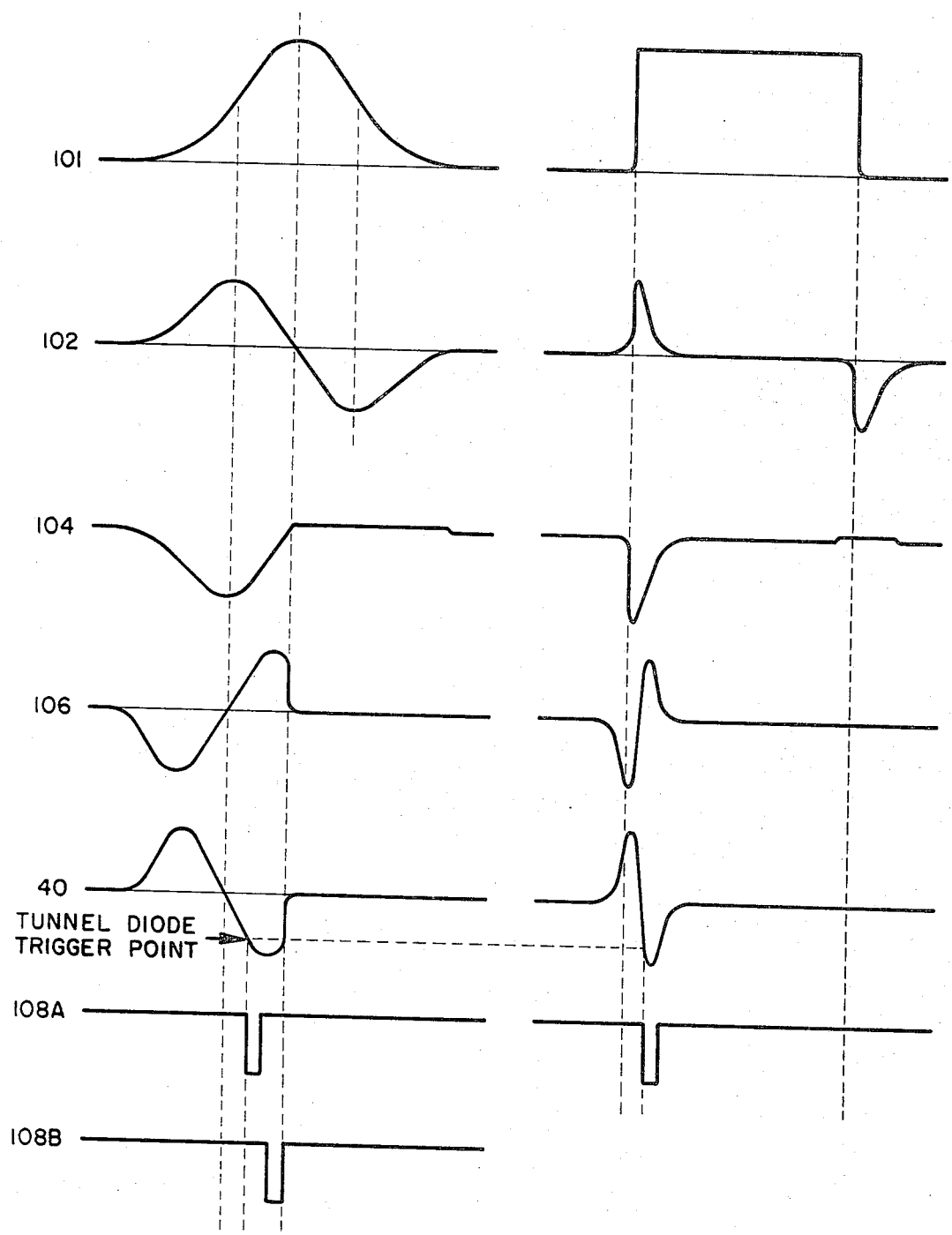

A complete understanding of the invention may be had from the following description of a particuar embodiment of the invention. In the description, reference is made to the accompanying drawing of which the FIGURE 1 is a schematic diagram of a peak power indicator circuit in accordance with a preferred embodiment of the present invention and FIGURE 2 is a timing chart indicating the time relationship of signals at various points in the circuit of FIG. 1.

Referring now to the figure and accompanying timing chart, there is illustrated an input terminal 10 to which a video input signal is applied through an isolation circuit 12, respectively, to a sampling switch 14 by conductor 16, and the peak sensing circuit 18 by conductor 20. As is described hereinbelow, the peak sensing circuit 18 detects the time of the peak point of the input pulse, which may resemble a Gaussian pulse or square pulse, and there is derived from the peak sensing circuit a negative pulse on conductor 22 which is coincident in peak point with the time of the Gaussian input pulse or with the flat top of a square pulse applied to the sampling switch 14 from the isolation circuit by conductor 16. The negative pulse whose timing is generated by the peak sensing circuit is applied by conductor 22 to the sampling switch 14 to close the high-speed sampling switch for shorting a capacitor 28 to the video input pulse applied from terminal 10 through the isolation circuit to charge the capacitor 28. The high-speed sampling switch 14 is closed during the occurrence of the peak of the Gaussian shaped video pulse or during the period of the flat top in the case of the square pulse. The capacitor 28 charges or discharges, depending upon its previous charge, so that the resultant charge is accordingly adjusted by charging or discharging, to the value of the pulse at its peak point, which is while the high-speed sampling switch is closed. Since the charge of the capacitor 28 follows the shape of the pulse applied to terminal 10 as connected to the capacitor through the isolation circuit as long as the sampling switch 14 is closed the entire time that the sampling switch is closed must correspond to the time of the vicinity of the peak value of the pulse being measured and the time of the opening of the electronic switch must correspond precisely to the time of the peak of the pulse being measured. (In the specific instance of the preferred embodiment of the invention, the half amplitude width of the Gaussian shaped pulse being measured is 3 microseconds and the time that the sampling switch is closed is approximately 0.3 microsecond.) Upon termination of the pulse on conductor 22, which is at the precise time of the peak of the Gaussian pulse, the high-speed sampling switch 14 opens and the impedance between conductor 16 the charge side of capacitor 28 returns to its normal high impedance state.

After the capacitor 28 has been charged, it commences to discharge through the high impedance of the open sampling switch 14 and a high input impedance amplifier 32. The time constant of the capacitor discharge may be generally in excess of one second. It is only this discharge time constant which limits the maximum time between incoming pulses being measured which in turn is a function of the leakage of the open sampling switch 14 and the input impedance of the high input impedance amplifier 32. In the specific instance of the preferred embodiment of the invention, the maximum repetition time of occurrence of input pulses being measured is typically one second.

In the peak sensing circuit 18 there is a differentiating circuit network 34 to which is applied the video input signal through the isolation circuit by conductor 20 to phase shifters 36, 37 of the differentiating circuit network 34. Clipper circuit 33 is used, in the case of a square pulse to prevent false triggering after the occurrence of the trailing edge of that pulse. The phase shifters comprise a capacitance and resistance network, and they each shift the phase of the input signals so that at an output terminal 38 of the differentiating circuit network there is provided a signal 40 as shown which is coupled to a pulse shaper 45 having a tunnel diode 44. The tunnel diode circuit acts as a stable trigger circuit and is caused to fire at a fixed point on the negative going slope of waveform 40. When the tunnel diode 44 fires, it causes a transistor 50 to immediately conduct providing thereby the generation of an output pulse that is shaped by condenser 52 and resistor 54 to obtain a pulse having a fixed or determinable pulse width, this fixed width pulse causes transistor 58 of the switch driver 56 to turn-on, and generating thereby a narrow rectangular pulse that is used to operate the sampling switch 14, as applied thereto over conductor 22.

The function of the peak sensing circuit 18 can best be understood by referring to the timing chart which considers the phase shifters 36 and 37 as ideal differentiating circuits. Waveform 101, which is located at conductor 20, is applied to phase shifter 36. Considering the phase shifter 36 as an ideal differentiator, the output waveform amplitude 102 is the value of the slope of the waveform 101. Thus, the crossover between the positive and negative portions of waveform 102 corresponds to the peak amplitude of waveform 101 since the slope of waveform 101 is zero at that point. Transistor 103 acts as an inverter, stable amplifier, and isolator using standard circuit techniques. The inverted output of transistor 103 is clipped by the clipper circuit 33 and results in the waveform 104. The transistor 105 provides isolation between the clipper 33 and the phase shifter 37. Phase shifter 37 also acts as a differentiating circuit to produce waveform 106. Transistor 107 acts as an inverter, stable amplifier and isolator which results in waveform 40. Pulse shaper 45 includes a stable compensated tunnel diode trigger circuit which results in the output waveform 108 at conductor 22. Since the phase shifters 36 and 37 are not ideal differentiators, the crossover point between the positive and negative portions of the waveforms can be varied in time by the selection of component values. Thus, by the selection of components in the peak sensing circuit the sampling pulse 108B on conductor 22 can be adjusted in time such that the opening of the sampling switch 14 corresponds to the peak of the input Gaussian shaped pulse at conductor 10. Therefore for each pulse width or standard deviation of the Gaussian shaped pulse, component values can be selected to place the sampling pulse 108 at the peak point of the input waveform by selecting component values in phase shifters 36 and/or 37 or by making specific phase shifter circuit components variable the optimum timing can be obtained simply by varying the values until the voltage on meter lead 92 is at a maximum. In the preferred embodiment of the invention, accurate tracking of the pulse peak occurs for a 7 to 1 change in pulse amplitudes at the input conductor 10. Waveform 108B shows typical timing of triggering pulse on conductor 22 after phase shifter calibration.

The timing chart also shows the waveforms for a square input pulse. In this case the sampling pulse may occur anytime during the flat-top portion of the pulse. For the square pulse the maximum width is limited only by the occurrence of the next pulse which is a function of repetition rate of the pulses. The minimum width of the square pulse is limited by the width of the sampling pulse 108 and the component values on the phase shifters 36 and 37. In the preferred embodiment of the invention where values were selected for 3 microseconds half amplitude pulse width Gaussian shaped pulses, the minimum square pulse width was also in the vicinity of 3 microseconds.

Phase shifters 36, 37, together with RC network 52, 54 of the pulse shaper determine the time when the sampling switch closes and opens in relation to the input waveform. These values are determined and selected such that the sampling switch 14 closes just prior to the peak of the input signal to permit sufficient time to equalize the charge on capacitor 28 with that value of the pulse applied from the terminal 10 to the isolation circuit to the capacitor 28, and to open the sampling switch 14 immediately upon the input signal arriving at its peak value thereof. The sampling switch 14 is thus opened precisely at the peak of the input signal applied from terminal 10 to the switch 14 and guarantees that capacitor 28 is provided with a charge equal to the peak of the input signal. In other words, the charge of the capacitor 28 is equal to the peak value of the input signal.

The sampling switch 14 includes transistors 41, 43 and 42, 44 together with pulse transformers 46, 48 connected in circuit relation so that upon the application of the narrow rectangular pulse from transistor 58 over conductor 22 to the switch 14, this causes the switch to open by the resultant current flow effected by the pulse from the transistor 58 to completely saturate transistors 41, 43 and 42, 44 by providing thereby a low impedance path for the charge or discharge of capacitor 28 to equalize with the instantaneous peak value of the input signal applied to terminal 10 through the isolation circuit 12.

Upon the termination of the pulse from the switch driver 56 over conductor 22, the transistors 41, 43 and 42, 44 are no longer saturated and return to their initial high impedance condition, and the only capacitor 28 discharge current that may then flow is the substantially small leakage current of the transistors, which is typical for the transistors as selected for use in the sampling switch 14 and amplifier 76. The discharge path of capacitor 28 when the sampling switch is open is through the high impedance states of transistors 41, 43 and 42, 44, and the additional high impedance discharge path provided by a field effect transistor 64 of the high impedance amplifier 32.

The high impedance amplifier as explained below in the preferred embodiment of the invention is used only as a direct coupled amplifier to drive an indicator which indicates the charge on the capacitor 28 without excessively discharging the same and in no way limits the scope of the invention. In the preferred embodiment of the invention the DC voltage gain from the capacitor 28 to the output 90 is one. The field effect transistor 64 is coupled to a field effect transistor 66 which is connected to it to form a compensated differential amplifier in which compensation thereof is achieved by a Zener diode 68 and a transistor 70 coupled to the compensating resistance 72.

The output signal from each of the field effect transistors 64, 66 is presented to an integrated differential amplifier 76 having a transistor 78, and the output of the transistor 78 is coupled to transistors 80, 82 of a meter drive amplifier 84. The output of transistor 82 is coupled to an output terminal 90, and a meter terminal 92. A milliameter may be connected to terminal 92 so that the meter indicates the peak power or voltage level of RF video pulses applied to the input terminal 10.

It is understood that the specific apparatus herein illustrated and described is intended to be representative only, as there are many changes which may be made therein without departing from the clear teachings of the invention. Accordingly, reference should be made to the following claims in determining the full scope of the invention.

What is claimed is:
1. An indicating circuit comprising:
   an input circuit for applying pulse-shaped input signals to circuits electrically isolated from each other;
   a sensing circuit connected to receive pulse-shaped input signals from the input circuit and including differentiating circuits and phase shifter networks for sensing the peak values of each of the pulse-shaped input signals;
   means connected to said peak sensing circuit for producing a pulse which occurs at the exact time of the peak value of the pulse-shaped input signal sensed by said sensing circuit;
   a capacitor;
   a switch connected to the input circuit for sampling the pulse-shaped input signals as isolated from the peak sensing circuit and connected to transmit each of said pulse-shaped input signals to charge said capacitor while said switch is closed;
   means for applying said pulse which occurs at the exact time of the peak value of the pulse-shaped input signal to said sampling switch for closing said switch; and
   means for applying the charge of said capacitor through a high impedance network for indicating the peak value of said pulse-shaped input signal.
2. The invention of claim 1 wherein a switch driver is connected responsive to the pulse producing means for driving the sampling switch into a closed condition.
3. The invention of claim 1 wherein said sampling switch comprises transistor means for transmitting the pulse-shaped input signal without distortion amplification to the capacitor, and transformer means coupled to the base electrode of said transistor means and connected to receive the signals from said sensing circuit for controlling passage of signals by said transistor means.

4. The invention of claim 1 wherein a high impedance path is presented to the charge of said capacitor when the sampling switch is in the open condition for providing a small leakage current; said path including a field effect transistor connected to receive current from said capacitor, a compensated differential amplifier including said transistor and responsive to the charge of the capacitor, and an integrated differential amplifier connected to receive the output of said compensated amplifier for driving the charge value of the capacitor representing the peak value of the pulse-shaped input signal to actuate a meter.

References Cited
UNITED STATES PATENTS

| | | | |
|---|---|---|---|
| 3,017,521 | 1/1962 | Herstedt | 307—88.5 |
| 3,166,678 | 1/1965 | Fleshman et al. | 328—150 X |
| 3,173,089 | 3/1965 | Poole | 324—102 |

ARCHIE R. BORCHELT, *Primary Examiner.*

E. F. KARLSEN, *Assistant Examiner.*